United States Patent
Seleznyov

(10) Patent No.: US 9,578,492 B2
(45) Date of Patent: Feb. 21, 2017

(54) SECURE MECHANISM TO DELIVER MOBILE TRAFFIC MANAGEMENT CONFIGURATION UPON STUB ACTIVATION ON A MOBILE DEVICE OF A GLOBAL SERVICE DISCOVERY SERVER

(71) Applicant: Seven Networks, LLC., Marshall, TX (US)

(72) Inventor: Alexandr Seleznyov, Espoo (FI)

(73) Assignee: Seven Networks, LLC, San Carlos, CA (US)

( * ) Notice: Subject to any disclaimer, the term of this patent is extended or adjusted under 35 U.S.C. 154(b) by 0 days.

(21) Appl. No.: 14/474,327

(22) Filed: Sep. 2, 2014

(65) Prior Publication Data

US 2015/0056955 A1 Feb. 26, 2015

Related U.S. Application Data

(63) Continuation of application No. PCT/US2014/042817, filed on Jun. 17, 2014.

(60) Provisional application No. 61/836,108, filed on Jun. 17, 2013, provisional application No. 61/883,922, filed on Sep. 27, 2013.

(51) Int. Cl.
| | |
|---|---|
| *H04M 1/66* | (2006.01) |
| *H04W 8/24* | (2009.01) |
| *H04W 4/14* | (2009.01) |
| *H04W 12/06* | (2009.01) |
| *H04W 8/18* | (2009.01) |
| *H04W 88/18* | (2009.01) |

(52) U.S. Cl.
CPC ............ *H04W 8/245* (2013.01); *H04W 4/14* (2013.01); *H04W 8/18* (2013.01); *H04W 12/06* (2013.01); *H04W 88/18* (2013.01)

(58) Field of Classification Search
CPC ........ H04W 12/06; H04W 60/00; H04W 4/14
See application file for complete search history.

(56) References Cited

U.S. PATENT DOCUMENTS

| | | | |
|---|---|---|---|
| 7,243,333 B2 | 7/2007 | Gschwind et al. | |
| 2003/0217136 A1* | 11/2003 | Cho et al. | 709/223 |
| 2009/0199176 A1* | 8/2009 | Nath et al. | 717/178 |
| 2011/0087757 A1* | 4/2011 | Paalanen et al. | 709/219 |
| 2011/0250901 A1* | 10/2011 | Grainger et al. | 455/456.1 |
| 2013/0054969 A1 | 2/2013 | Charles et al. | |
| 2013/0067542 A1 | 3/2013 | Gonsalves et al. | |

OTHER PUBLICATIONS

IPRP for Application No. PCT/US2014/042817 dated Oct. 1, 2014.

* cited by examiner

*Primary Examiner* — Justin Lee
(74) *Attorney, Agent, or Firm* — NK Patent Law, PLLC

(57) ABSTRACT

A network is provided that includes a mobile device and a configurable stub having a stub configuration embedded in the mobile device non-transitory memory. An operating server has an operating server processor and the operating server is configured to send Short Messaging Service (SMS) messages. A processor controlled global service discovery server is configured to receive the stub configuration and to inform the mobile device about the operating server.

31 Claims, 5 Drawing Sheets

FIG. 4

SECURE MECHANISM TO DELIVER MOBILE TRAFFIC MANAGEMENT CONFIGURATION UPON STUB ACTIVATION ON A MOBILE DEVICE OF A GLOBAL SERVICE DISCOVERY SERVER

CROSS-REFERENCE TO RELATED APPLICATIONS

This application is a continuation of PCT Patent Application No. PCT/US14/42817 filed on Jun. 17, 2014, which claims priority to U.S. Provisional Patent Application No. 61/836,108 filed on Jun. 17, 2013, and U.S. Provisional Patent Application No. 61/883,922 filed on Sep. 27, 2013, the contents of both of which are incorporated by reference herein.

BACKGROUND

Mobile devices are used by many persons in many different countries and on many different carriers. Information such as the country of use and the carrier is important for mobile device traffic management systems.

Activation of a mobile device should be secure, while providing sufficient identifying information to identify the carrier, location, and other relevant information that a network service provider may need in order to provide efficient network management. This information is not ideally provided in an SMS body since SMS can be faked (spoofed).

Accordingly, there is a need for a technique that provides a secure way to deliver configuration upon activation.

BRIEF SUMMARY

In one aspect the present invention takes the form of a system having a mobile device with an embedded stub having a stub configuration. The system further includes an operating server having traffic management protocols and which is configured to support the communications of the mobile device subject to the traffic management protocols. In addition, a global service discovery server receives the stub configuration and informs the mobile device about the operating server.

The stub can cause the mobile device to communicate with the global service discovery server when the mobile device initially boots up, when the mobile device resets; or when a SIM card is changed. If the mobile device is associated with a first carrier but the changed SIM card is associated with a second carrier the global service discovery server identifies a host server of the second carrier and then the mobile device is updated to be associated with the second carrier. The global service discovery server may identify an operator and country of use.

Beneficially the global service discovery server may check to see if the mobile device is registered. If so, the mobile device profile may be updated or registered. The mobile device profile might include at least one of an IMEI number, a device manufacturer, a carrier, and a country of use.

The stub can be activated upon receipt of a Short Messaging Service (SMS) from the operating server, which can be identified by the operating server. If so, the stub may request application software from the operating server. The operating server may send the mobile device the requested application software.

The stub itself may be embedded by an original equipment manufacturer while the global service discovery server might send the mobile device a mobile country code (MCC), a mobile network code (MNC), and an International mobile station equipment identity (IMEI).

Beneficially, the global service discovery server stores a security key which is also stored by the operator server. Then, the global service discovery server can send the key to the mobile device, the mobile device can then send that key to the operator server, and the operator server may verify the validity of the key and if valid send the mobile device application software.

According to another aspect the present invention includes a mobile device having an embedded stub with a stub configuration, an operating server having traffic management protocols to support the communications of the mobile device, and a global service discovery server for receiving the stub configuration and for informing the mobile device about the operating server. The stub sends the global service discovery server a request to register to mobile device, the global service discovery server registers the mobile device, the operating server sends an activation SMS to the mobile device, in response to the SMS the stub causes the mobile device to request an operation configuration, and the operating server sends the operation configuration to the mobile device.

Beneficially, the stub causes the mobile device to request application software from the operating server and then the operating server sends the requested application software to the mobile device, which is then installed.

In practice the stub causes the mobile device to communicate with the global service discovery server when the mobile device initially boots up; when the mobile device resets; or when a SIM card is changed. If the mobile device is associated with a first carrier, but the changed SIM card is associated with a second carrier, the global service discovery server identifies a host server of the second carrier and the mobile device is updated to be associated with the second carrier.

The global service discovery server might identify an operator and country of use or the operation configuration might include at least one of an IMEI number, a device manufacturer, a carrier, and a country of use. The stub may be embedded by an original equipment manufacturer. The operating server may send the mobile device a mobile country code (MCC), a mobile network code (MNC), and an International mobile station equipment identity (IMEI).

Preferably the global service discovery server stores a key, the operator server stores that key, the global service discovery server sends that key to the mobile device, the mobile device sends that key to the operator server, the operator server verifies the validity of the key and if valid sends the mobile device application software According to another aspect of the invention, the invention is a network having a mobile device with a mobile device processor, mobile device transient memory, a SIM card, mobile device non-transitory memory storing a mobile device profile, mobile device bi-directional communication capabilities, a mobile device operating system embedded in the mobile device non-transitory memory, and a configurable stub having a stub configuration embedded in the mobile device non-transitory memory. The network further includes an operating server having an operating server processor, operating server non-transitory memory, operating server bi-directional communication capabilities, an operating server operating system stored in the operating server non-transitory memory, wherein the operating server is configured to support traffic management protocols that support the bi-directional communications of the mobile device subject, and wherein the operating server is configured to send Short Messaging Service (SMS) messages. That network also includes a processor controlled global service discovery server that is configured to receive the stub configuration and to inform the mobile device about the operating server.

In practice the stub causes the mobile device to communicate with the global service discovery server when the mobile device initially boots up, when the mobile device resets, or when the SIM card is changed. When the mobile device is associated with a first carrier but the changed SIM card is associated with a second carrier the global service discovery server identifies a host server of the second carrier and the mobile device is updated to be associated with the second carrier. Usually the global service discovery server identifies an operator and country of use.

Often the global service discovery server checks whether the mobile device is registered. If the mobile device is registered the global service discovery server updates the mobile device profile but if not registered the global service discovery server registers the mobile device. Often the mobile device profile includes at least one of an IMEI number, a device manufacturer, a carrier, and a country of use.

The stub maybe activated upon receiving a Short Messaging Service (SMS) from the operating server. That server may be identified by the global service discovery server.

In practice the stub may requests application software from the operating server. If so, the operating server may send the mobile device requested application software.

The stub itself may be embedded by an original equipment manufacturer. The global service discovery server may send the mobile device a mobile country code (MCC), a mobile network code (MNC), and an International mobile station equipment identity (IMEI).

According to yet another aspect of the invention, the invention is a network comprising a mobile device having a mobile device processor, mobile device transient memory, a SIM card, a mobile device profile, mobile device non-transitory memory, mobile device bi-directional communication capabilities, a mobile device operating system embedded in the mobile device non-transitory memory, and a configurable stub having a stub configuration embedded in the mobile device non-transitory memory. The network may further includes a processor controlled operating server having an operating server processor, operating server non-transitory memory, operating server bi-directional communication capabilities, an operating server operating system embedded in the operating server non-transitory memory, wherein the operating server is configured to support traffic management protocols and to support the bi-directional communications of the mobile device subject to the traffic management protocols, and wherein the operating server is configured to send Short Messaging Service (SMS) messages. That network may also include a processor controlled global service discovery server configured to receive the stub configuration and to inform the mobile device about the operating server. The stub sends the global service discovery server a request to register the mobile device. In response the global service discovery server registers the mobile device. After the operating server sends activation SMS to the mobile device the stub causes the mobile device to request an operation configuration from the operating server which the operating server sends to the mobile device.

In practice the stub causes the mobile device to communicate with the global service discovery server when the mobile device initially boots up, when the mobile device resets, or when a SIM card is changed. If the mobile device is associated with a first carrier but the changed SIM card is associated with a second carrier the global service discovery server identifies a host server of the second carrier and the mobile device is updated to be associated with the second carrier.

According to another aspect of the invention that invention takes the form of a mobile device having a processor, transient memory, a SIM card, non-transitory memory storing an operating system; and communication hardware to provide bi-directional communications. The non-transitory memory further stores a mobile device profile and a stub. The stub directs the processor to cause the communication hardware to contact a global service discovery server to obtain information about an operating server configured to support bi-directional communications of mobile device.

In practice, the stub directs the processor to cause the communication hardware to contact the global service discovery server when the mobile device initially boots up, when the mobile device resets, or when a SIM card is changed.

According to still another aspect of the invention that invention takes the form of a mobile device having a processor, transient memory operatively connected to the processor, a SIM card operatively connected to the processor, non-transitory memory operatively connected to the processor and storing an operating system; and communication hardware operatively connected to the processor to provide bi-directional communications in accord with traffic management protocols. The non-transitory memory also stores a mobile device profile and a stub. The stub directs the processor to cause the communication hardware to contact a global service discovery server to register the mobile device and to obtain information about an operating server that is configured to support bi-directional communications in accord with the traffic management protocols. When the mobile device receives an activation SMS from the operating server the mobile device request an operation configuration from the operating server. The mobile device stores the received operation configuration in the mobile device profile.

BRIEF DESCRIPTION OF THE SEVERAL VIEWS OF THE DRAWINGS

FIG. 4 is a user interface display as a tool provided in communication with an operating server or global server according to one or more embodiments disclosed herein.

DETAILED DESCRIPTION

Figure 1:
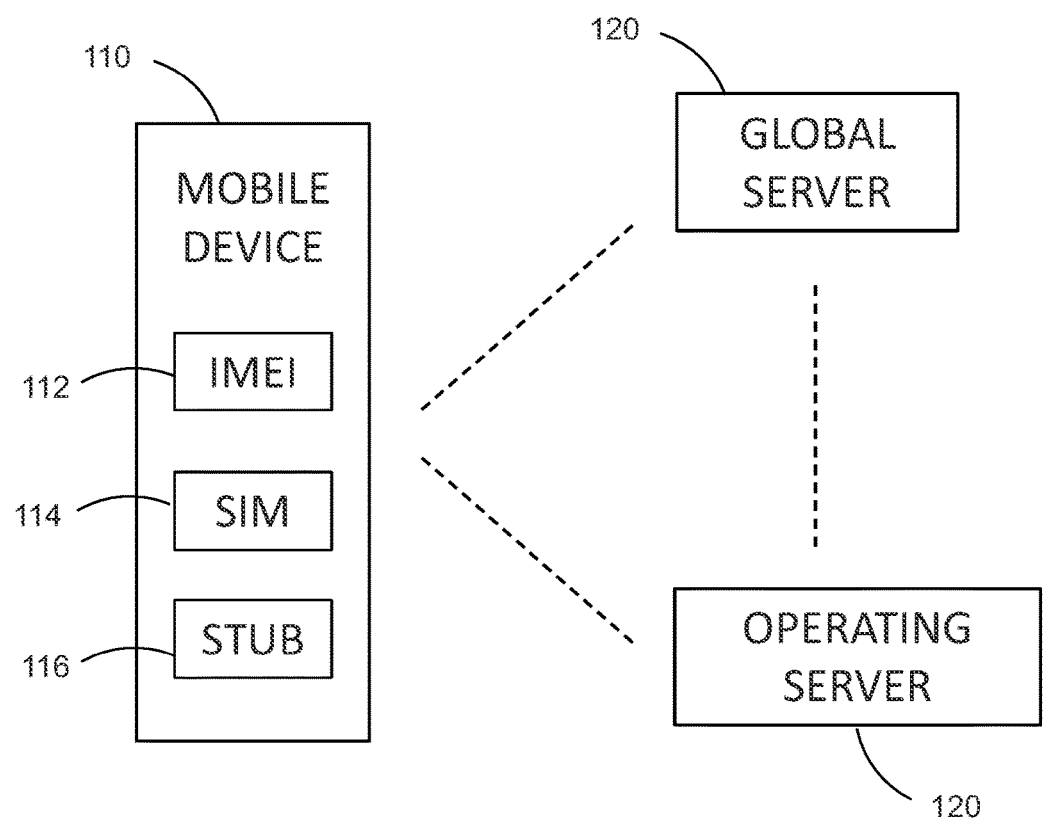
FIG. 1 is a system diagram according to one or more embodiments disclosed herein.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for secure mechanism to deliver mobile traffic management configuration upon stub configuration on a mobile device by a global service discovery server. The disclosed innovation includes the example components: the stub and the GSD (global service discovery) server. The former can be distributed through the original equipment manufacturer (OEM) integration and the latter can be hosted by the host server. In one embodiment, the OEM can host their specific instance. Note that in embodiments of the present disclosure, the host server and local proxy are components of the present innovation which individually and in combination provide mobile device resource, mobile network and/or mobile traffic resource management, optimization functionalities and features.

The stub and the GSD (global service discovery) server can be used for, for example: discovering the host server when stubs get activated with SMS messages; or, registering devices (the server can store storing mobile country code (MCC)+mobile network code (MNC)+International mobile station equipment identity (IMEI)).

Embodiments of the present disclosure include systems and methods for secure mechanism to deliver mobile traffic management configuration upon stub configuration on a mobile device by a global service discovery server. The disclosed innovation includes the example components: the stub and the GSD (global service discovery server) server. The former can be distributed through the original equipment manufacturer (OEM) integration and the latter can be hosted by the host server. Note that in embodiments of the present disclosure, the host server and local proxy are components of the present innovation which individually and in combination provide mobile device resource, mobile network and/or mobile traffic resource management, optimization functionalities and features.

As illustrated in FIG. 1, a system 100 is depicted. The system 100 includes a mobile device 110. The mobile device 110 may be a personal display device, a cellular phone, a smart-phone, and the like. The mobile device 110 may further include an International Mobile Station Equipment Identify number (IMEI) that is used for identifying the mobile device. IMEI or its hash may be used for identifying the mobile device. A SIM card 114 may be provided with the mobile device 110 and may be network or carrier specific. A stub 116, as further described herein, may also be embodied on the mobile device 110. Memory 118 and a processor 119 may also be provided.

A global server 120 may be provided. An operating server 130 may be in communication with the mobile device 110 and be operating over a cellular network. The operating server 130 may be carrier specific in one or more embodiments.

Figure 2:
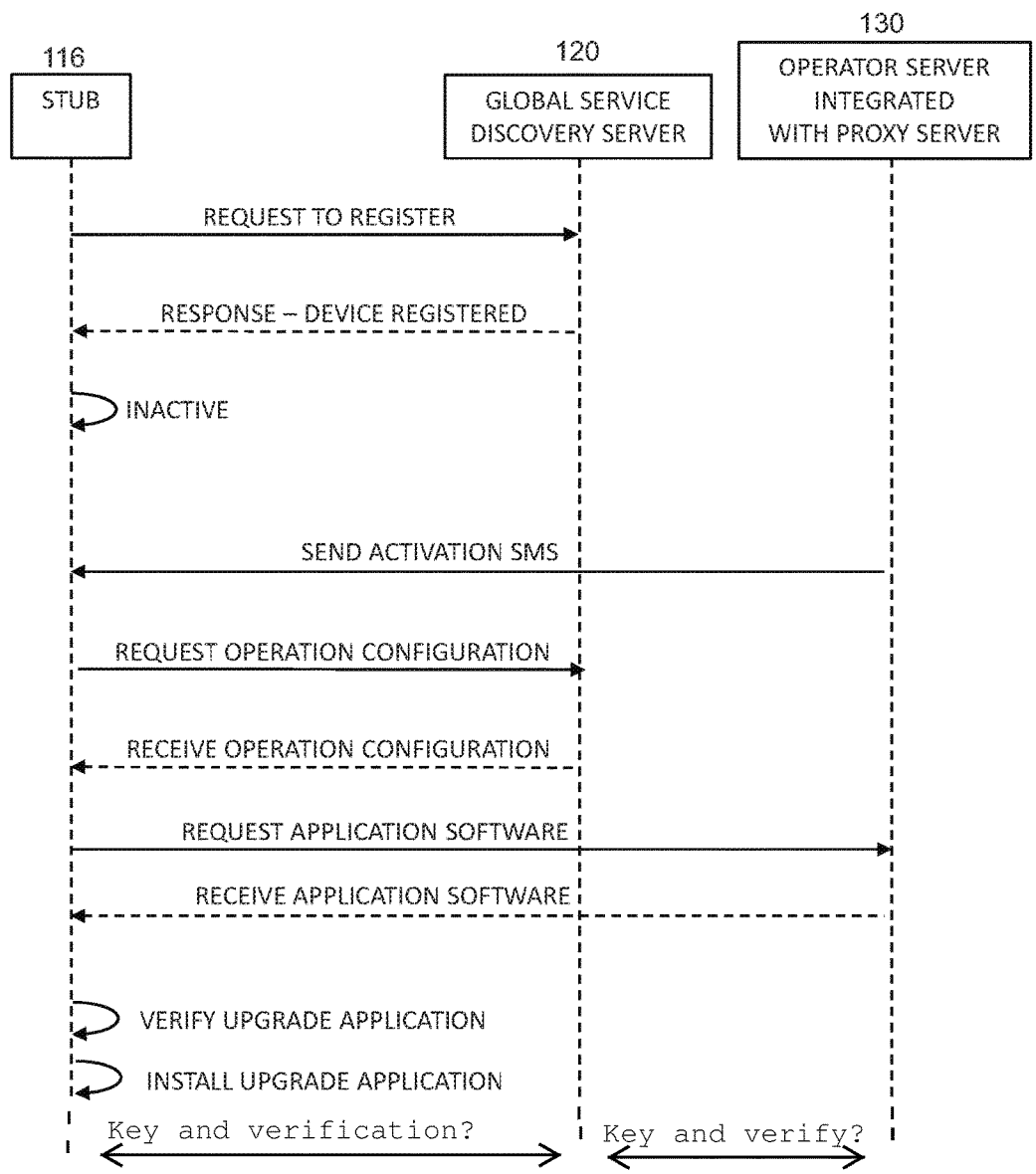
FIG. 2 is a signal flow diagram according to one or more embodiments disclosed herein.

A signal flow diagram representing one or more methods disclosed herein is illustrated in FIG. 2. The stub 116 may be configured to request registration from the global server 120, and, in response to that request, the global server 120 may be configured to send a device registration response to stub 116. During this period, the mobile device 110 may be inactive until the operator server 130 communicates via an activation SMS to the stub 116. The stub 116 may then request operation configuration instructions or programs from the global server 120, and, in response thereto, the global server 120 may send operation configuration instructions which are received by stub 116. The stub 116 may request application software from the operator server 130, and, in response thereto, the operator server 130 may communicate application software to stub 116, which receives the application software. The stub 116 or mobile device 110 may then verify an upgrade application and install the upgrade application software.

The stub 116 and the GSD 120 can be used for, for example: discovering the host server when stubs get activated with SMS messages. In one or more embodiments, the stub 116 and global server 120 may be used for registering devices (the server 120 can store storing mobile country code (MCC)+mobile network code (MNC)+International mobile station equipment identity (IMEI) or its hashed form).

In one embodiment, the stub 116 can be configured to operate in multiple modes (e.g., two modes). For example, in one mode, stub 116 may be configured for a silent mode. In this mode, the stub 116 or mobile device 110 runs upon receiving an activation SMS or other messages or triggers. The SMS or other message or trigger may be received from the global server 120 or the operator server 130.

In another mode, stub 116 may be configured for operating in a "registering mode." In this mode, the stub 116 contacts the GSD server 120 when the mobile device 110 boots for the first time, after the mobile device 110 resets, and/or when SIM card 114 is changed, or when the SIM card 114 performs periodic sync ups. The information obtained during registrations can be used to find or activate phones or mobile devices 110 that have been sold before the operator installs the host server (e.g., the proxy server, or functionalities provided by the proxy server) or mobile devices that are not subsidized by operator (not under operator's control).

In the silent mode, the stub 116 can be activated with an SMS message or other types of messages or triggers. Then the stub 116 communicates with the goes to GSD 120 (global service discovery server) and determines or identifies the operator and country specific configuration for the particular host server for the geographic region (e.g., country, location, region, etc.) and determines, identifies, and/or retrieves the associated local proxy client package from there. In one or more embodiments, stub 116 may identify a lesser number of these characteristics. In the registration mode, the stub 116 registers with the GSD 120 (global service discovery server). Activation occurs according to the description already provided herein. When mobile devices 110 move between networks, such as when SIM cards are changed, the stub 116 can verify with GSD 120 to determine whether there is a host server available (for the network of the new SIM card).

If there is a host server available for the network (e.g., the network service provider or the carrier has integrated the host server's services, platform, or server), the stub 116 will obtain the new configuration applicable to the new network and upgrade itself, but on different mobile network. In this manner, the activation can happen automatically and on the fly (no SMS may be required). In one embodiment, this can be configured and reconfigured (turned on or off) based on operator's wishes.

In one or more embodiments, on a mobile device 110, a local proxy/stub 116 can discover if an operator that is supplying the present SIM card 114 has an instance of a host server and/or where it is located geographically. In one or more embodiments, if a carrier/mobile operator installs or integrates a host server (e.g., proxy server or functionalities/ on its network or network server), there are mobile devices with stubs that can start using the host server and/or its functionalities right away. The operator needs to be able to find out the list for potential remote activation.

The following functionalities (minimal functional requirement) are assumed to be provided globally by the service:

The stub is inactive until activated by an SMS message. In one embodiment, stubs 116 can connect to service and/or the GSD (global service discovery server) to check for configuration, which can provide information about the operator and/or country of the active SIM card and the device.

Service will check if the operator/country/device combination or its part has been registered before. If no, the combination will be registered. If yes, the device's profile will be updated. Based on MCC/MNC combination the service can determine if there is a host server configuration available and return it in case of success or return nothing if there is no host server available.

Figure 4:
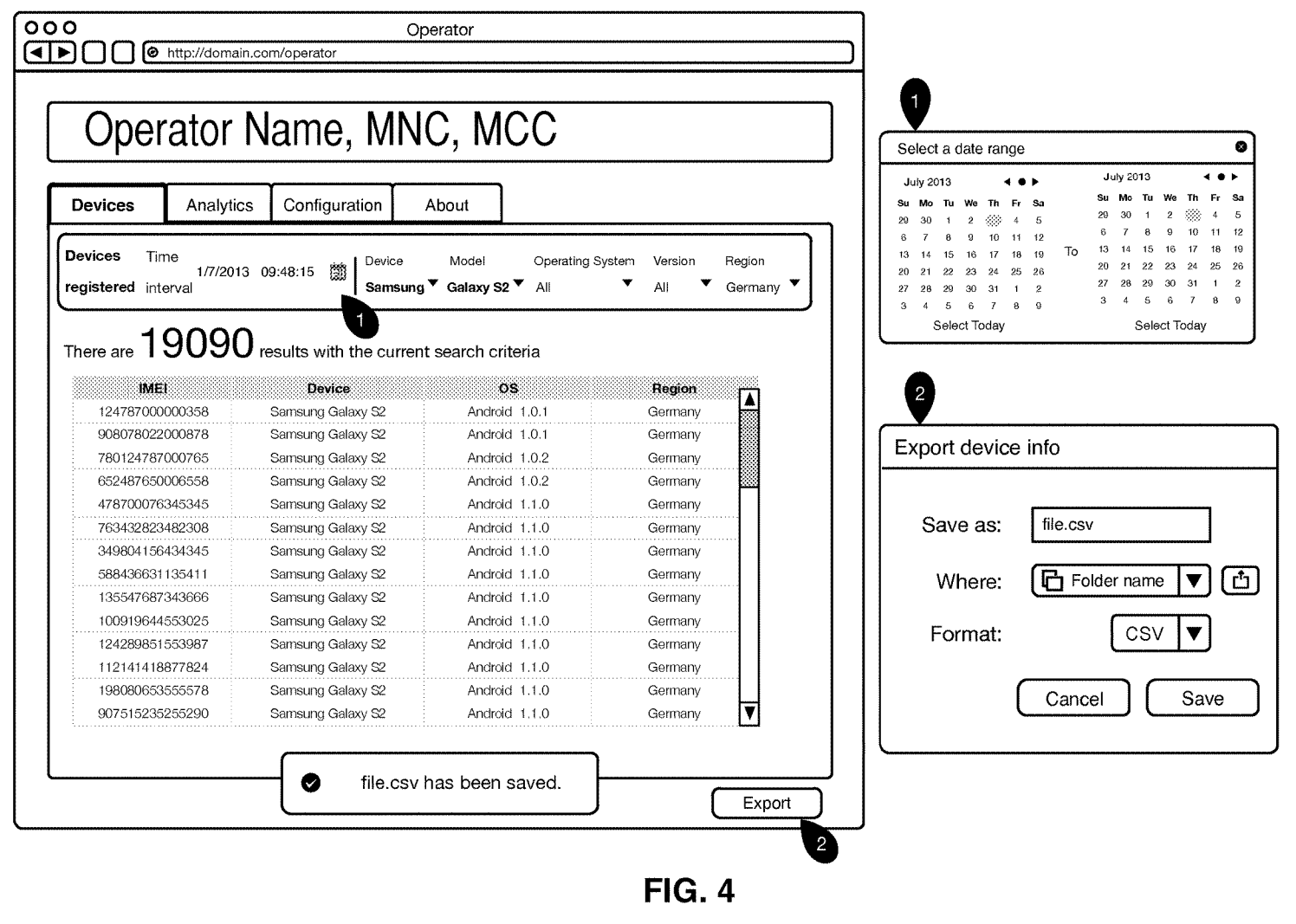
Figure 5:
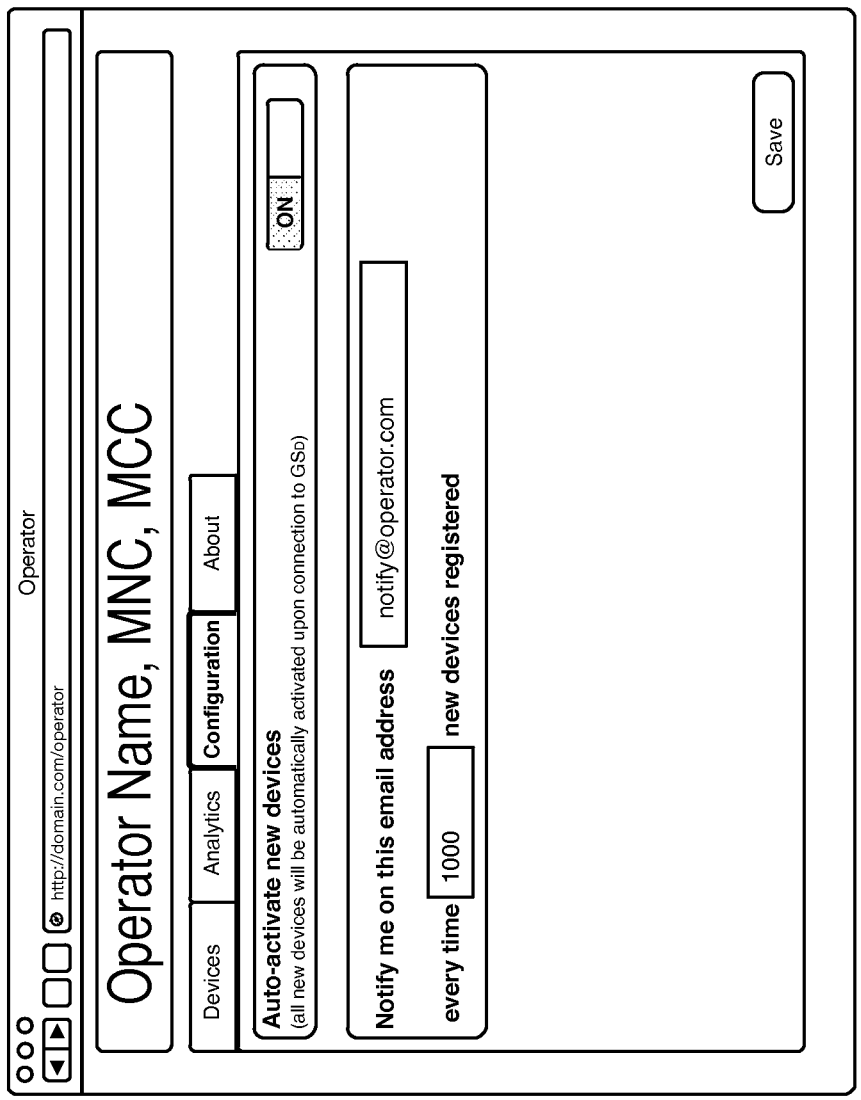
FIG. 5 is a user interface display as a tool provided in communication with an operating server or global server according to one or more embodiments disclosed herein.

FIGS. 4 and 5 show example operator user interfaces. Each operator can have its own page or view based on credentials provided by the system. For example, as illustrated in FIG. 4, an operator can view and filter devices by OEM or device vendor, model, operating system, version, region, and the like and can further limit timeline of when devices registered. For example, an operator can select a date range to views results corresponding to the selected data range. The user interface can also include an export feature that allows an operator to save or export the result list as a CSV, XLS, RTF, and any other suitable format.

When the configuration tab is selected from the user interface shown in FIG. 4, the user interface of FIG. 5 is displayed. Via the configuration page, an operator can turn on/off automatic activation of new devices that appear in the operator's network after a host server is available or discovered. When a new device checks for configuration on, for example, SIM swap (i.e., replacing existing SIM with a new SIM), a configuration for the host server can be returned right away, so there is no need to activate the device separately by an SMS message. The user interface can also include a subscription feature that allows an operator to subscribe for notification once a configurable number (e.g., 1000, 500) of devices have been registered or activated. The configurations are then saved by the system.

One embodiment of the present innovation includes an administrative interface which can be used for, for example: debug, configuration and data querying purposes. In addition to standard maintenance scenarios it can also be used to query for devices on specific operator's network that can be upgraded or configured to work with the host server.

Figure 3:
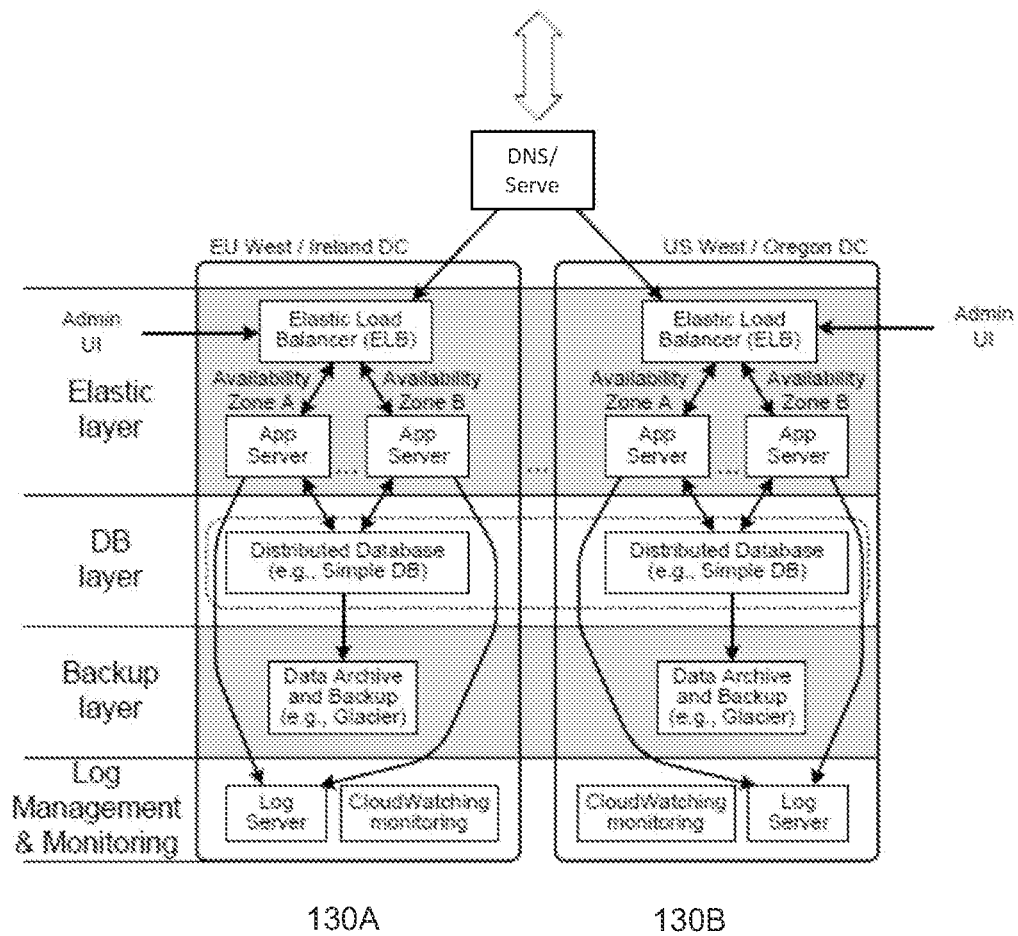
FIG. 3 is a diagram of various operating servers according to one or more embodiments disclosed herein.

An example architecture of the disclosed technology is shown in FIG. 3. There can be multiple instances of the data center geographically distributed in the disclosed innovation, for example in EU/Ireland and US/Oregon. The data centers may be operating servers 130A and 130B. However, more can be transparently provisioned later based on the number of devices spread over different geographical locations/continents.

Each data center can include, for example, an ELB (elastic load balancer) on entrance balancing (round robin) requests across application servers. Application servers can be placed into more than one availability zone. Therefore, fail over is supported on two levels—inside a single data center as well as between data centers. Each ELB is configured to make sure that 1) at least two application server instances are available per DC, 2) instances are located in different availability zones. When an instance of a data center misbehaves, breaks, or disappears ELB (elastic load balancer) can spawn another one making sure two application servers instance are running as minimum.

The distributed database (e.g., SimpleDB) can be used as a storage for operator specific configurations as well as for storing device profiles. High-availability and cross data center replication is provided as a part of managed service. The distributed database (e.g., SimpleDB) can include a key/value store that does basic indexing that allows lookups in values.

Every service instance can perform daily backups or archiving (e.g., or at other timing intervals). Service instances can spread times of backups over 24 hours to minimize potential risk window. For example, for two-instance system: one instance would make backups at 12 a.m. and the other at 12 p.m., 8 hours shift would be used for three instances, and so on.

Due to auto scaling used, application server instances can come and go automatically. To keep track record of events, syslog-ng can be used to have a centralized copy of log files in each data center. Auto scaling can be implemented as a policy that is provisioned to a network monitoring service. The service may spawn an application server each time a scale out rule is triggered. It will also shut down an app server each time a scale down criterion is satisfied. The general rule is: scale out/up aggressively, scale down carefully. The average CPU utilization is used as a trigger:

In one embodiment, every time the average (for app servers) CPU utilization reaches 60% over five minutes interval a new application server instance can be added In one embodiment, every time the average CPU utilization drops below a threshold, for example over a certain amount of time, for example, 30% or less over a five minute interval, a random application server instance can be shut down.

The disclosed technique provides a secure way to deliver configuration upon activation. Since the stub itself is in one embodiment, generic. In integration with OEMs we may not know where the mobile devices are going to end up after being sold (country, operator, etc.) The information is not ideally provided in an SMS' body since SMS can be faked (spoofed). Therefore, when the stub is activated communicates with the GSD to obtain information about the host server instance for this particular operator.

The disclosed technology enables mobile devices moving from one operator to another (and between countries). None, or both, or any of operators may have one or more of the host server(s).

When one or more host servers are installed in an operator's network, the stubs allow the operator to "find" phones on already on their network that have stubs and can be activated. The disclosed technology can be used to approach operators saying that there are already 'N' mobile devices that are network management capable, in other words, enabled to utilize the traffic management and/or device resource management services provided by the host server and/or the local proxy client. Note that in embodiments of the present disclosure, the host server and local proxy are components of the present innovation which individually and in combination provide mobile device resource, mobile network and/or mobile traffic resource management, optimization functionalities and features. In a further embodiment, the disclosed technology also handles with situations when mobile devices are reset. When a mobile device is reset, the local proxy is removed and the original stub is restored. Since the stub is configured and implemented to automatically communicate with the GSD (global service discovery server) to check for configuration, after mobile devices reset, they will retrieve or obtain the configuration and install the local proxy again.

A further embodiment of the disclosed technology includes security and protection of the local proxy package. When the GSD is provisioned with a new operator specific configuration for traffic and network resource management provided by the host server instance (s), which has a "secret" (key) as a part of it. Same key can be tracked, managed, and retained by the host server instance. For example, when a mobile device is activated it comes to the GSD (global service discovery server) and obtains a device specific token as a part of the returned configuration. This token can be sent to the host server when the stub attempts to download the local proxy client package. Having the same key, the host server can verify the validity of the token and return and send the local proxy client package upon determining that the token is valid In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

The invention claimed is:

1. A network, comprising:
   a mobile device having a mobile device processor, mobile device transient memory, a SIM card, mobile device non-transitory memory storing a mobile device profile, mobile device bi-directional communication capabilities, a mobile device operating system embedded in the mobile device non-transitory memory, and a configurable stub having a stub configuration embedded in the mobile device non-transitory memory;
   an operating server having an operating server processor, operating server non-transitory memory, operating server bi-directional communication capabilities, an operating server operating system stored in the operating server non-transitory memory, wherein the operating server is configured to support traffic management protocols that support the bi-directional communications of the mobile device subject; and
   a processor controlled global service discovery server configured to receive the stub configuration and to inform the mobile device about the operating server,
   wherein the global service discovery server sends the mobile device at least one of a location and network identity, a mobile network code (MNC), and information required to obtain a device identity,
   wherein the global service discovery server stores a key, the operator server stores the same key, the global service discovery server sends the key to the mobile device, the mobile device sends that key to the operator server, and the operator server verifies the validity of the key and sends the mobile device application software if the key if valid.

2. The network of claim 1, wherein the stub causes the mobile device to communicate with the global service discovery server when the mobile device initially boots up.

3. The network of claim 1, wherein the stub causes the mobile device to communicate with the global service discovery server when the mobile device resets.

4. The network of claim 1, wherein the stub causes the mobile device to communicate with the global service discovery server when the SIM card is changed.

5. The network of claim 4, wherein when the mobile device is associated with a first carrier but the changed SIM card is associated with a second carrier the global service discovery server identifies a host server of the second carrier and the mobile device is updated to be associated with the second carrier.

6. The network of claim 1, wherein the global service discovery server identifies an operator and country of use.

7. The network of claim 1, wherein the global service discovery server checks whether the mobile device is registered.

8. The network of claim 7, wherein, if the mobile device is registered the global service discovery server updates the mobile device profile.

9. The network of claim 7, wherein the global service discovery server registers the mobile device if the mobile device is not registered.

10. The network of claim 7, wherein the mobile device profile includes at least one of an IMEI number, a hashed IMEI number, a device manufacturer, a carrier, and a country of use.

11. The network of claim 1, wherein the stub is activated upon receiving a Short Messaging Service (SMS) from the operating server.

12. The network of claim 11, wherein global service discovery server identifies the operating server.

13. The network of claim 12, wherein the stub requests application software from the operating server.

14. The network of claim 13, wherein the operating server sends the mobile device application software.

15. The network of claim 1, wherein the stub is embedded by an original equipment manufacturer.

16. The network of claim 1, wherein the at least one of location and network identity comprises.

17. A network, comprising:
   a mobile device having a mobile device processor, mobile device transient memory, a SIM card, a mobile device profile, mobile device non-transitory memory, mobile device bi-directional communication capabilities, a mobile device operating system embedded in the mobile device non-transitory memory, and a configurable stub having a stub configuration embedded in the mobile device non-transitory memory;
   a processor controlled operating server having an operating server processor, operating server non-transitory memory, operating server bi-directional communication capabilities, an operating server operating system embedded in the operating server non-transitory memory, wherein the operating server is configured to support traffic management protocols and to support the bi-directional communications of the mobile device subject to the traffic management protocols; and
   a processor controlled global service discovery server configured to receive the stub configuration and to inform the mobile device about the operating server;
   wherein the stub sends the global service discovery server a request to register the mobile device;
   wherein the global service discovery server registers the mobile device;
   wherein operating server sends an operation configuration to the mobile device,
   wherein the global service discovery server sends the mobile device at least one of a location and network identity, a mobile network code (MNC), and information required to obtain a device identity,
wherein the global service discovery server stores a key, the operator server stores that key, the global service discovery server sends the key to the mobile device, the mobile device sends that key to the operator server, and the operator server verifies the validity of the key and sends the mobile device application software if the key if valid.

18. The network of claim 17, wherein the stub causes the mobile device to request application software from the operating server.

19. The network of claim 18, wherein the operating server sends the requested application software to the mobile device.

20. The network of claim 19, wherein the mobile device installs the application software.

21. The network of claim 17, wherein the stub causes the mobile device to communicate with the global service discovery server when the mobile device initially boots up.

22. The network of claim 17, wherein the stub causes the mobile device to communicate with the global service discovery server when the mobile device resets.

23. The network of claim 17, wherein the stub causes the mobile device to communicate with the global service discovery server when a SIM card is changed.

24. The network of claim 23, wherein the mobile device is associated with a first carrier but the changed SIM card is associated with a second carrier the global service discovery server identifies a host server of the second carrier and the mobile device is updated to be associated with the second carrier.

25. The network of claim 17, wherein the global service discovery server identifies an operator and country of use.

26. The network of claim 17, wherein the operation configuration includes at least one of an IMEI number, a hashed IMEI number, a device manufacturer, a carrier, and a country of use.

27. The network of claim 17, wherein the stub is embedded by an original equipment manufacturer.

28. The network of claim 17, wherein the at least one of location and network identity comprises a mobile country code (MCC).

29. A network, comprising:
a mobile device having a mobile device processor, mobile device transient memory, a SIM card, mobile device non-transitory memory storing a mobile device profile, mobile device bi-directional communication capabilities, a mobile device operating system embedded in the mobile device non-transitory memory, and a configurable stub having a stub configuration embedded in the mobile device non-transitory memory;
an operating server having an operating server processor, operating server non-transitory memory, operating server bi-directional communication capabilities, an operating server operating system stored in the operating server non-transitory memory, wherein the operating server is configured to support traffic management protocols that support the bi-directional communications of the mobile device subject; and
a processor controlled global service discovery server configured to receive the stub configuration and to inform the mobile device about the operating server,
wherein the global service discovery server stores a key, the operator server stores the same key, the global service discovery server sends the key to the mobile device, the mobile device sends that key to the operator server, and the operator server verifies the validity of the key and sends the mobile device application software if the key if valid.

30. A network, comprising:
a mobile device having a mobile device processor, mobile device transient memory, a SIM card, a mobile device profile, mobile device non-transitory memory, mobile device bi-directional communication capabilities, a mobile device operating system embedded in the mobile device non-transitory memory, and a configurable stub having a stub configuration embedded in the mobile device non-transitory memory;
a processor controlled operating server having an operating server processor, operating server non-transitory memory, operating server bi-directional communication capabilities, an operating server operating system embedded in the operating server non-transitory memory, wherein the operating server is configured to support traffic management protocols and to support the bi-directional communications of the mobile device subject to the traffic management protocols; and
a processor controlled global service discovery server configured to receive the stub configuration and to inform the mobile device about the operating server;
wherein the stub sends the global service discovery server a request to register the mobile device;
wherein the global service discovery server registers the mobile device;
wherein the operating server sends an operation configuration to the mobile device,
wherein the global service discovery server stores a key, the operator server stores the same key, the global service discovery server sends the key to the mobile device, the mobile device sends that key to the operator server, and the operator server verifies the validity of the key and sends the mobile device application software if the key if valid.

31. A server comprising:
a processor controlled operating server having an operating server processor, operating server non-transitory memory, operating server bi-directional communication capabilities, an operating server operating system embedded in the operating server non-transitory memory, wherein the operating server is configured to support traffic management protocols and to support the bi-directional communications of the mobile device subject to the traffic management protocols; and
wherein a mobile device has a mobile device processor, mobile device transient memory, a SIM card, a mobile device profile, mobile device non-transitory memory, mobile device bi-directional communication capabilities, a mobile device operating system embedded in the mobile device non-transitory memory, and a configurable stub having a stub configuration embedded in the mobile device non-transitory memory;
wherein a processor controlled global service discovery server is configured to receive the stub configuration and to inform the mobile device about the operating server;
wherein the stub sends the global service discovery server a request to register the mobile device;
wherein the global service discovery server registers the mobile device;
wherein the operating server sends an operation configuration to the mobile device, wherein the global service discovery server stores a key, the operator server stores the same key, the global service discovery server sends the key to the mobile device, the mobile device sends that key to the operator server, and the operator server verifies the validity of the key and sends the mobile device application software if the key if valid.

* * * * *